(12) United States Patent
Bailey et al.

(10) Patent No.: US 10,660,320 B2
(45) Date of Patent: May 26, 2020

(54) METHOD AND APPARATUS FOR INJECTING BAIT INTO FISHING LURES

(71) Applicants: Steven Bailey, Washington, MO (US); Isidore I. Lamke, Union, MO (US)

(72) Inventors: Steven Bailey, Washington, MO (US); Isidore I. Lamke, Union, MO (US)

( * ) Notice: Subject to any disclaimer, the term of this patent is extended or adjusted under 35 U.S.C. 154(b) by 423 days.

(21) Appl. No.: 15/096,937

(22) Filed: Apr. 12, 2016

(65) Prior Publication Data

US 2016/0309688 A1  Oct. 27, 2016

Related U.S. Application Data

(60) Provisional application No. 62/150,382, filed on Apr. 21, 2015.

(51) Int. Cl.

| *A01K 85/01* | (2006.01) |
|---|---|
| *A01K 97/00* | (2006.01) |
| *A01K 97/04* | (2006.01) |
| *A01K 99/00* | (2006.01) |

(52) U.S. Cl.
CPC .............. *A01K 85/01* (2013.01); *A01K 97/00* (2013.01); *A01K 97/04* (2013.01); *A01K 97/045* (2013.01); *A01K 99/00* (2013.01)

(58) Field of Classification Search
CPC ........ A01K 85/01; A01K 97/00; A01K 97/04; A01K 99/00; A01K 97/18; B26F 1/14
USPC .... 43/42.06, 42.53, 4, 4.5, 55, 53.5; 83/686; 29/255, 278, 257, 280; 606/184, 185, 606/567
See application file for complete search history.

(56) References Cited

U.S. PATENT DOCUMENTS

| 1,162,901 | A | * | 12/1915 | Cantey | ................. | A21C 11/106 |
|---|---|---|---|---|---|---|
| | | | | | | 219/227 |
| 2,102,739 | A | * | 12/1937 | Peters | .................. | A01K 97/045 |
| | | | | | | 43/41 |
| 2,129,245 | A | * | 9/1938 | Stenstrom | .............. | A01K 85/01 |
| | | | | | | 43/42.06 |
| 2,705,949 | A | * | 4/1955 | Silverman | .......... | A61B 10/0275 |
| | | | | | | 600/567 |
| 2,869,279 | A | * | 1/1959 | Pretorius | ................ | A01K 85/01 |
| | | | | | | 43/42.06 |

(Continued)

FOREIGN PATENT DOCUMENTS

| CN | 203719938 | U | * | 7/2014 | | |
|---|---|---|---|---|---|---|
| GB | 509487 | A | * | 7/1939 | ........... | A21C 11/106 |

(Continued)

OTHER PUBLICATIONS

Hi-Liner Fishing Gear & Tackle Inc., Sashibo Tuna Grader; Available web site: https://web.archive.org/web/20120916125032/http://hiliner.com:80/category/product-catalog/miscellaneous/; downloaded on Aug. 15, 2018.*

(Continued)

*Primary Examiner* — Darren W Ark

(74) *Attorney, Agent, or Firm* — Sandberg Phoenix & von Gontard PC

(57) ABSTRACT

A tool for injecting prepared bait into an artificial fishing lure having a handle with a generally linear upper portion and a punch tube moveably engaged with the upper portion for movement between a retracted position and an extended position to bore the fishing lure, receive bait in the tube, and inject bait into the bored fishing lure.

15 Claims, 4 Drawing Sheets

(56) References Cited

U.S. PATENT DOCUMENTS

| | | | | | |
|---|---|---|---|---|---|
| 2,892,284 | A | * | 6/1959 | Shawhan | A01K 97/18 43/53.5 |
| 3,001,320 | A | * | 9/1961 | Sonner, Jr. | A01K 97/18 294/103.1 |
| 3,108,389 | A | * | 10/1963 | Mcguire | A01K 85/00 43/42.06 |
| 3,280,497 | A | * | 10/1966 | Tschida | A01K 85/01 43/42.06 |
| 3,403,466 | A | * | 10/1968 | Young | A01K 97/045 141/329 |
| 3,434,230 | A | * | 3/1969 | Littlefield | A01K 85/01 43/42.06 |
| 3,477,423 | A | * | 11/1969 | Griffith | A61B 10/0275 600/567 |
| 3,487,575 | A | * | 1/1970 | Jones | A01K 97/00 43/4 |
| 3,526,988 | A | * | 9/1970 | Young | A01K 97/045 426/1 |
| 3,701,352 | A | * | 10/1972 | Bosworth | A61B 17/32053 408/97 |
| 3,721,034 | A | * | 3/1973 | Collins | A01K 97/18 43/53.5 |
| 3,774,607 | A | * | 11/1973 | Schmitz | A61M 37/0069 604/61 |
| 3,802,115 | A | * | 4/1974 | Auten | A01K 85/01 43/42.24 |
| 3,835,572 | A | * | 9/1974 | Mounsey | A01K 85/01 43/42.06 |
| 3,918,190 | A | * | 11/1975 | Hornbeck | A01K 85/01 43/17.6 |
| 3,988,851 | A | * | 11/1976 | Sacharnoski, Sr. | A01K 85/01 43/42.31 |
| 3,991,504 | A | * | 11/1976 | Pieper | A01K 85/00 43/42.06 |
| 4,007,732 | A | * | 2/1977 | Kvavle | A61B 10/02 378/162 |
| 4,077,406 | A | * | 3/1978 | Sandhage | A61M 37/0069 604/61 |
| 4,083,477 | A | * | 4/1978 | Zetterberg | A01K 97/04 141/21 |
| 4,129,955 | A | * | 12/1978 | Schommer | A01K 97/045 43/4 |
| 4,203,246 | A | * | 5/1980 | Sacharnoski, Sr. | A01K 85/01 43/42.24 |
| 4,244,370 | A | * | 1/1981 | Furlow | A61F 2/26 128/DIG. 20 |
| 4,257,182 | A | * | 3/1981 | Thom | A01K 85/16 43/42.06 |
| 4,267,658 | A | * | 5/1981 | Brown | A01K 97/02 43/42.06 |
| 4,314,565 | A | * | 2/1982 | Lee | A61B 10/0283 600/566 |
| 4,342,171 | A | * | 8/1982 | Cripps | A01K 97/18 43/53.5 |
| 4,516,438 | A | * | 5/1985 | Hodge | G01N 1/08 73/864.44 |
| 4,549,612 | A | * | 10/1985 | Cushing | E21B 11/005 175/20 |
| 4,553,348 | A | * | 11/1985 | Cooper | A01K 85/16 43/42.06 |
| 4,597,753 | A | * | 7/1986 | Turley | A61M 37/0069 227/67 |
| 4,603,502 | A | * | 8/1986 | MacDonald | A01K 97/02 43/41 |
| 4,726,138 | A | * | 2/1988 | Hurt | A01K 97/04 43/4.5 |
| 4,738,261 | A | * | 4/1988 | Enstrom | A61B 5/15142 606/172 |
| 4,785,826 | A | * | 11/1988 | Ward | A61B 10/025 30/174 |
| 4,823,497 | A | * | 4/1989 | Pierce | A01K 85/01 43/17.6 |
| 4,833,817 | A | * | 5/1989 | Silverthorn | A01K 97/18 43/53.5 |
| 4,867,933 | A | * | 9/1989 | Schmidt | A01K 85/00 264/36.15 |
| 4,903,430 | A | * | 2/1990 | DeWan | A01K 85/01 43/41 |
| 4,988,335 | A | * | 1/1991 | Prindle | A61M 37/0069 227/67 |
| 4,998,370 | A | * | 3/1991 | Lawler | A01K 85/01 43/42 |
| 5,005,433 | A | * | 4/1991 | Patton | E21B 25/005 73/863 |
| 5,117,571 | A | * | 6/1992 | Sites | A01K 97/04 43/4 |
| 5,142,811 | A | * | 9/1992 | Freeman | A01K 85/00 43/42.06 |
| 5,307,586 | A | * | 5/1994 | Palmer | A01K 97/18 43/4 |
| 5,444,935 | A | * | 8/1995 | Pahle | A01K 85/00 43/42.06 |
| 5,471,780 | A | * | 12/1995 | Hopson | A01K 85/01 43/42.06 |
| 5,517,781 | A | * | 5/1996 | Paoletta, Jr. | A01K 85/01 43/42.06 |
| 5,517,868 | A | * | 5/1996 | Turriff | E02D 1/04 175/20 |
| RE35,478 | E | * | 3/1997 | Crihfield | A01K 85/01 43/42.31 |
| 5,725,892 | A | * | 3/1998 | Gibbs | A01K 85/01 249/55 |
| 5,930,937 | A | * | 8/1999 | Bowersock | A01K 85/01 43/4.5 |
| 5,946,847 | A | * | 9/1999 | North | A01K 85/01 43/42.31 |
| 6,393,756 | B1 | * | 5/2002 | Forney | A01K 85/01 43/42.06 |
| 6,752,769 | B2 | * | 6/2004 | Alberico | A61B 10/0266 600/564 |
| 6,789,349 | B1 | * | 9/2004 | Stone | A01K 85/01 43/42.06 |
| 6,840,002 | B1 | * | 1/2005 | Dick | A01K 97/18 43/53.5 |
| 7,131,233 | B1 | * | 11/2006 | Preston | A01K 85/01 43/42.06 |
| 7,794,410 | B2 | * | 9/2010 | Mikulka | A61B 10/0266 600/562 |
| 8,813,418 | B2 | * | 8/2014 | Sundstrom | A01K 85/01 43/42.06 |
| 9,288,974 | B2 | * | 3/2016 | Alguire | A01K 95/02 |
| 9,480,496 | B2 | * | 11/2016 | Cole | A61B 17/32053 |
| 9,668,464 | B2 | * | 6/2017 | Mancini | A01K 85/00 |
| 10,022,179 | B2 | * | 7/2018 | Feinberg | A61B 18/1445 |
| 2003/0029075 | A1 | * | 2/2003 | Hebard | A01K 97/18 43/53.5 |
| 2004/0003531 | A1 | * | 1/2004 | Hulin | A01K 85/01 43/4.5 |
| 2005/0075651 | A1 | * | 4/2005 | Ortiz | A45D 29/16 606/131 |
| 2008/0294183 | A1 | * | 11/2008 | O | A61M 25/0637 606/185 |
| 2010/0281755 | A1 | * | 11/2010 | Armour | A01K 97/04 43/42.06 |
| 2015/0373957 | A1 | * | 12/2015 | Smith, Sr. | A01K 85/01 43/42.06 |
| 2019/0141975 | A1 | * | 5/2019 | Quiles | A01K 99/00 |

FOREIGN PATENT DOCUMENTS

| | | | | |
|---|---|---|---|---|
| GB | 2175181 | A | * | 11/1986 ............ A01K 97/04 |
| GB | 2305836 | A | * | 4/1997 ............ A01K 97/04 |
| GB | 2329567 | A | * | 3/1999 ............ A01K 97/04 |
| GB | 2314247 | B | * | 9/1999 ............ A01K 97/04 |
| GB | 2346059 | A | * | 8/2000 ............ A01K 97/04 |
| GB | 2402033 | A | * | 12/2004 ............ A01K 85/01 |
| GB | 2403389 | A | * | 1/2005 ............ A01K 97/04 |
| GB | 2498218 | A | * | 7/2013 ............ A01K 97/04 |

(56) References Cited

FOREIGN PATENT DOCUMENTS

| GB | 2500732 | A | * | 10/2013 | ............ A01K 97/04 |
|----|---------|---|---|---------|------------------------|
| JP | 2001045919 | A | * | 2/2001 | |
| JP | 2001069877 | A | * | 3/2001 | |
| JP | 2001178339 | A | * | 7/2001 | |
| JP | 2011030472 | A | * | 2/2011 | |
| KR | 20030035705 | A | * | 5/2003 | |
| NL | 9200533 | A | * | 10/1993 | ............ A01K 97/04 |
| WO | WO-8503200 | A1 | * | 8/1985 | ............ A01K 97/04 |

OTHER PUBLICATIONS

Hi-Liner Fishing Gear & Tackle Inc., Our Products, Miscellaneous; Available web site: https://web.archive.org/web/20120916125032/http://hiliner.com:80/category/product-catalog/miscellaneous/; Capture of a website at www.hiliner.com on Sep. 16, 2012 by archive.org; downloaded on Aug. 15, 2018.*

* cited by examiner

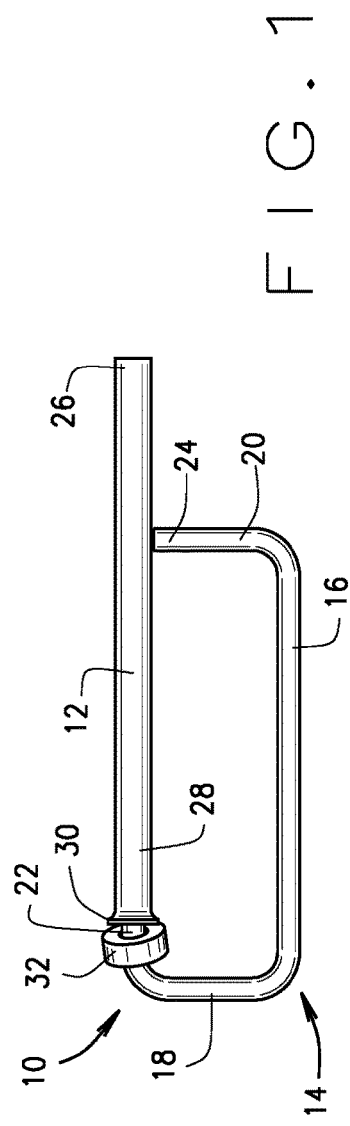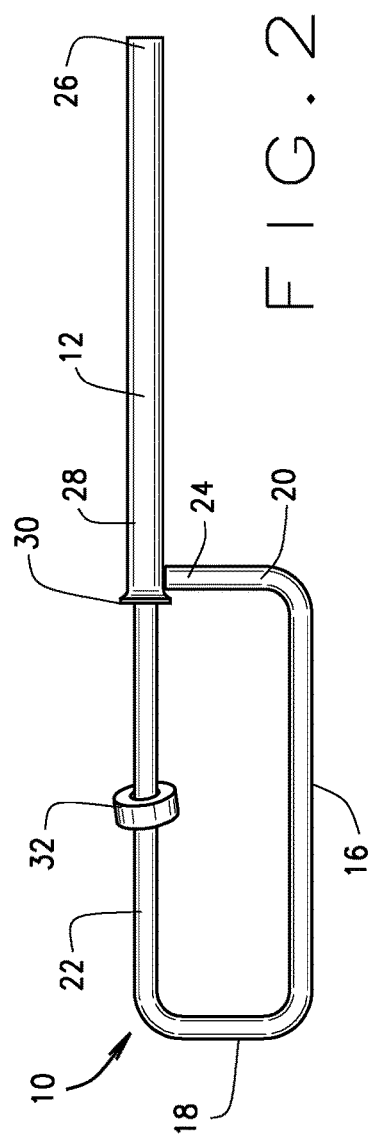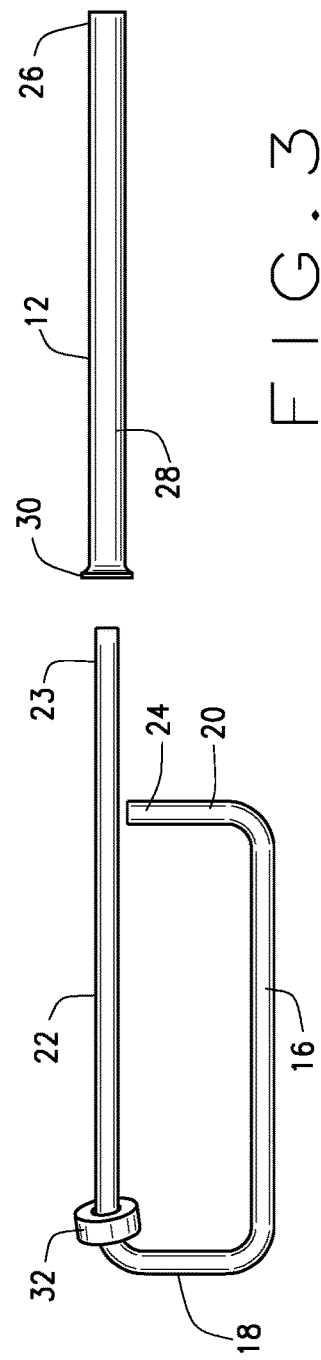

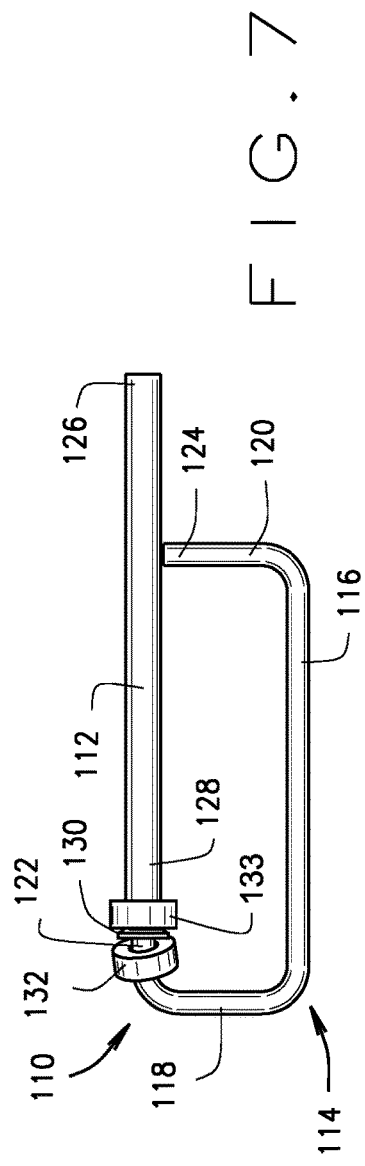
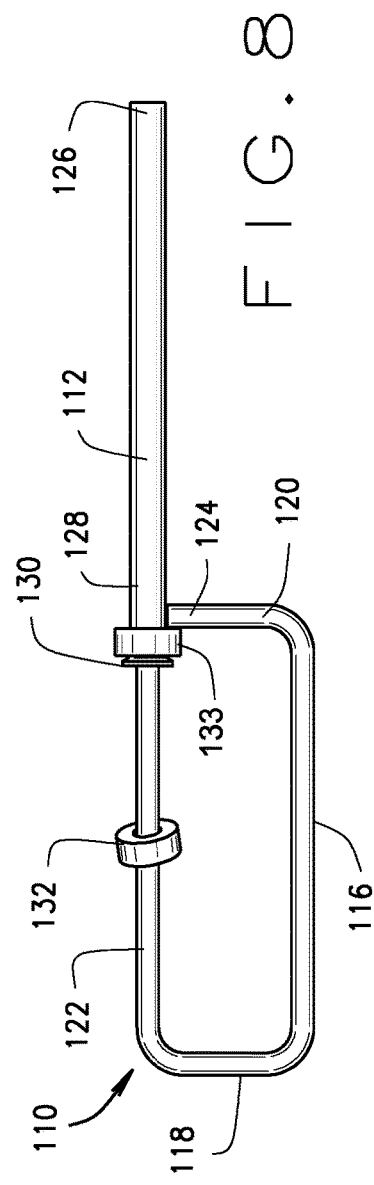
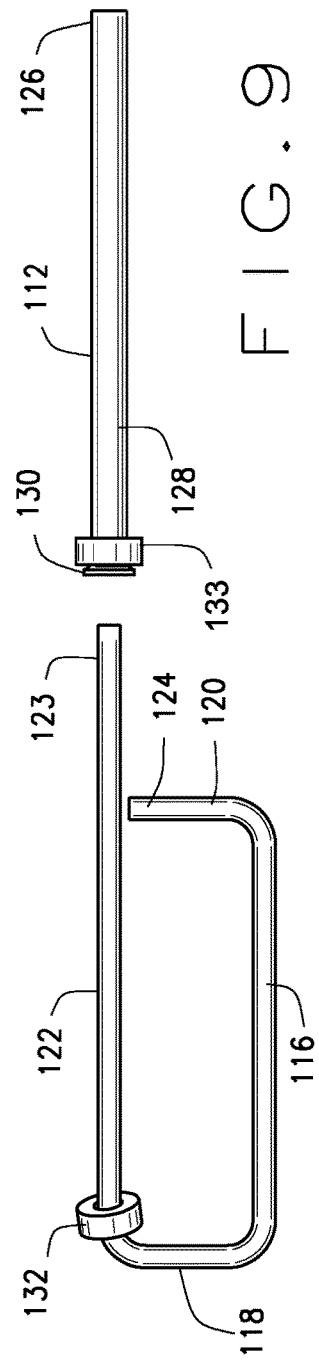

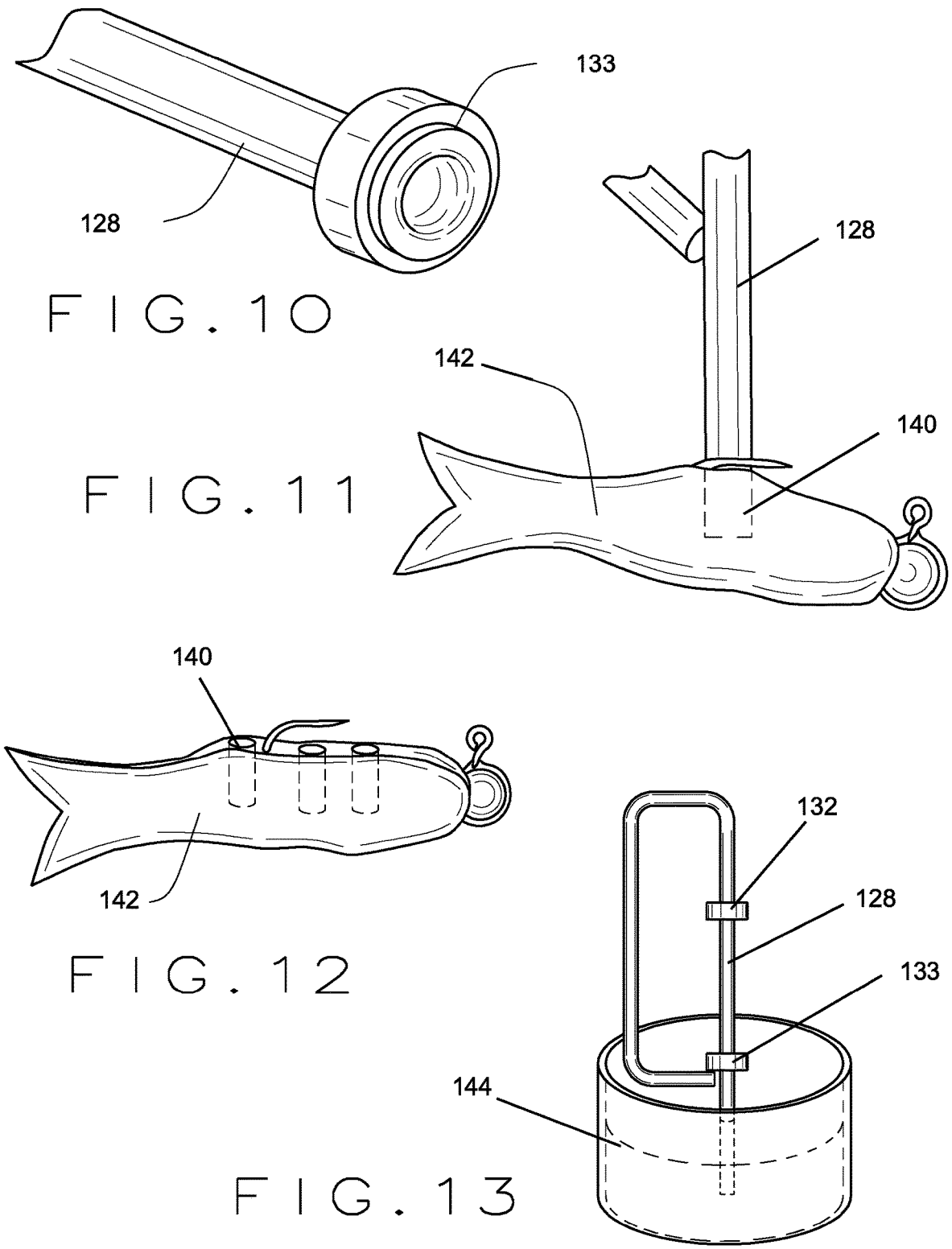

US 10,660,320 B2

METHOD AND APPARATUS FOR INJECTING BAIT INTO FISHING LURES

CROSS-REFERENCE TO RELATED APPLICATIONS

This Non-Provisional application claims priority to U.S. Provisional Application Ser. No. 62/150,382 filed Apr. 21, 2015, and which is incorporated herein by reference.

STATEMENT REGARDING FEDERALLY SPONSORED RESEARCH

Not applicable.

BACKGROUND

The present invention relates to a tool for enhancement of artificial fishing lures, and more particularly to a tool for injection of bait into artificial fishing lures.

Modern anglers generally have three categories of lures to choose from: live bait, prepared bait or attractant, and artificial lures. The choice of lures can depend on various factors and personal preference. Live bait is generally considered to be the most effective because of its natural texture, odor, and color. Typically, live bait includes worms, minnows, crickets, frogs, insects, shrimp, and leeches. However, live bait must be available and must be kept fresh. In addition, live bait must be replenished often.

Artificial lures come in a dizzying variety of shapes, sizes, colors, and strategies, which can generally be categorized as: jigs, spinners, spoons, plugs, spinerbaits, flies, and soft plastic baits. Generally, artificial lures are made to imitate prey characteristics, but can include any characteristic that attracts fish. Artificial lures can be stored almost indefinitely and can be used repeatedly. However, artificial lures are generally regarded as less attractive to fish than live bait.

Prepared bait is available commercially or can be prepared by the angler. Typically, prepared bait is made from a soft material, such as dough, and contains attractants, such as scent, flavoring, or color. In use, the angler places or molds the prepared bait onto a hook. However, many anglers find it difficult to keep prepared bait on the hook for very long. For example, the prepared bait can fall off the hook during casting or a fish can eat the bait without attaching to the hook.

Therefore, an apparatus and method to combine the advantages of artificial lures and prepared bait is needed.

DESCRIPTION OF THE DRAWINGS

In the accompanying drawings which form part of the specification:

FIG. 1 is a side view of a fishing lure injector in a retracted position;

FIG. 2 is a side view of the fishing lure injector in an extended position;

FIG. 3 is an exploded view of the fishing lure injector;

FIG. 7 is a side view of an alternate embodiment of a fishing lure injector in a retracted position;

FIG. 8 is a side view of an alternate embodiment of the fishing lure injector in an extended position;

FIG. 9 is an exploded view of an alternate embodiment of the fishing lure injector;

FIG. 10 is an enlarged perspective view of an alternate embodiment of a punch tube;

FIG. 11 is a perspective view of an alternate embodiment of the fishing lure injector creating a bore in an artificial fishing lure;

FIG. 12 is a perspective view of an alternate embodiment of the artificial fishing lure with a plurality of bores; and FIG. 13 is a perspective view of the fishing lure injector inserted into a prepared bait.

Corresponding reference numerals indicate corresponding parts throughout the several figures of the drawings.

DETAILED DESCRIPTION

Figure 4:
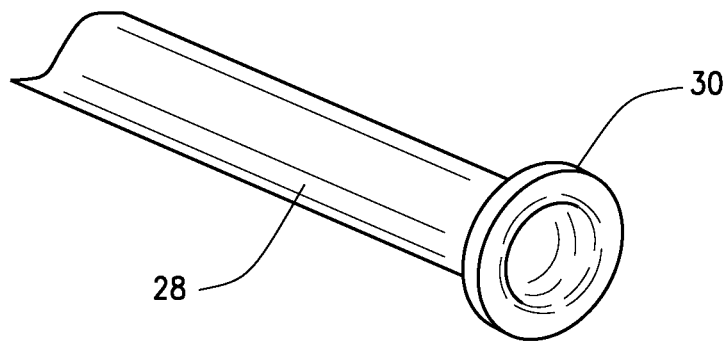
FIG. 4 is an enlarged perspective view of a punch tube.

The following detailed description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

As shown in FIGS. 1-6 and 13, an embodiment constructed in accordance with the present disclosure, generally referred to as a fishing lure injector 10, includes a punch tube 12 moveably coupled with a handle 14 for movement between a retracted position (FIG. 1) and an extended position (FIG. 2). The fishing lure injector 10 can be used to create a bore 40 in an artificial lure 42 and inject bait 44 into the bore 40 to enhance the effectiveness of the lure 42. The injector 10 can operate with any number of different generally soft baits, which can have a plurality of different viscosities.

The handle 14 is a generally rectangular-shaped frame having a lower portion 16, a first side portion 18, a second side portion 20, and an upper portion 22 (FIG. 3). Preferably, the handle 14 is a unitary wire that is bent at three points to form the generally rectangular shape. In the embodiment of FIGS. 1-6, the upper portion 22 includes an extension portion 23 extends beyond the second side portion 20 a predetermined distance, such as about 0.5". The upper end 24 of the second side portion 20 can be in contact with, but is not connected to the upper portion 22. Although, the embodiment of FIGS. 1-6 show a unitary wire handle, those skilled in the art will recognize that the handle 14 can also be formed by individual pieces that are joined together by any suitable means, such as welding, bonding, or adhesive.

In an alternate embodiment, the upper portion 22 can be detachably connected to the rest of the handle 14. In addition, the detachable upper portion 22 can attach to other shapes and sizes of handles, which may include various advertising materials, indicia.

The punch tube 12 is a generally linear hollow tube configured for moveable, preferably sliding, engagement with the upper portion 22 of the handle 14. The inner surface of the tube is generally smooth and sized for a generally sliding fit with the upper portion 22 of the handle 14. A front end 26 of the tube 12 is configured for punching a bore into an artificial lure, receiving bait, and injecting bait into the bore. A rear end 28 of the tube 12 has an outwardly flared rim 30 that is configured to prevent the punch tube 12 from unintentional removal from the handle 14 (FIG. 4). For example, the flared rim 30 is too large to pass between the upper portion 22 and the second side portion 20 and cannot pass through the first side portion 18. In this way, the length of movement of the tube 12 along the upper portion 22 is determined by the distance between the first side portion 18 and the second side portion 20. The retracted position is defined as when the flared rim 30 is in contact with the first side portion 18. The extended position is defined as when the flared rim 30 is in contact with the second side portion 24. Although the embodiment of FIGS. 1-6 show a punch tube 12 having a generally circular cross-section, the punch tube can have any suitable shape cross-section, including, but not limited to, square, oval, rectangular, triangular, rectilinear, or curvilinear.

A washer or collar 32 moveably, preferably sliding, engages the upper portion 22. During use, the washer 32 can be positioned at a predetermined position along the upper portion 22 for use as an indicator for the length of movement of the tube 12. The washer 32 also provides for a comfortable engagement of the flared rim 30 by the fingers of the user. The washer 32 is preferably made from a soft material, such as felt, but any suitable material can be used.

The handle 14 and punch tube 12 are preferably made from a metal material, such as steel or aluminum. However, any suitable material can be used, including, but not limited to plastic, wood, composite, or other material.

Figure 5:
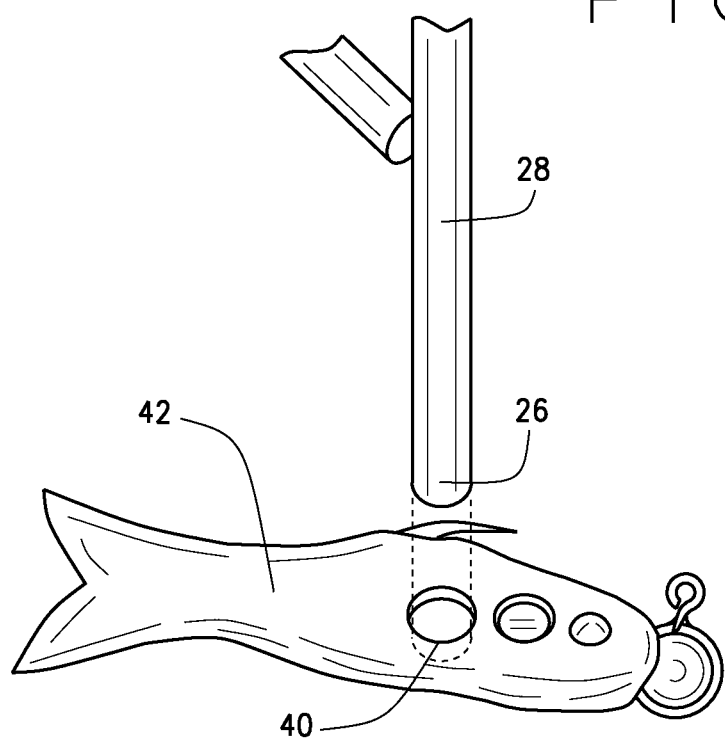
FIG. 5 is a perspective view of the fishing lure injector creating a bore in an artificial fishing lure.
Figure 6:
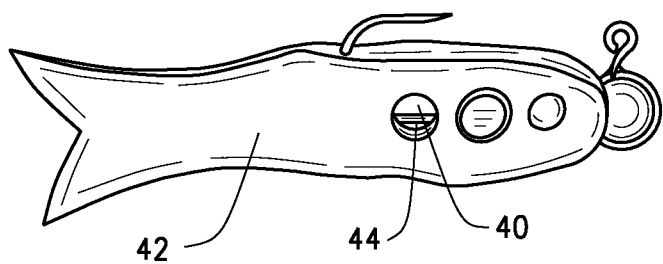
FIG. 6 is a perspective view of the artificial fishing lure with a plurality of bores.

In operation, the user moves the punch tube 12 to the extended position (FIG. 2). The user positions the front end 26 of the tube 12 at the desired position on the artificial lure 42 and presses the tube 12 into and/or through the lure 42 (FIG. 5). FIG. 5 shows the bore 40 extending through the sides of the lure 42. However, the bore 40 can be located anywhere on the respective lure 42. The tube 12 is removed from the lure 42, thereby creating the bore 40. The user moves the tube 12 to the retracted position, which advances the extended portion of the upper portion 22 through the tube 12 to push the piece of artificial lure 42 out of the tube 12. Next the user moves the tube 12 to the extended position and inserts the front end of the tube 12 into the bait 144 to fill the tube 12 (FIG. 13). The user inserts the tube 12 into the bore 42 and returns the tube 12 to the retracted position, which injects the bait 44 into the bore 42. The punch tube 12 can also be used to form bores in a lure of varying depths at varying angles. In addition, the tube 12 can punch a plurality of bores in a single lure 42. The lure 42 can be comprised of any plastic or rubber material.

Various types of advertising material or indicia may be incorporated into the injector 10. For example, a generally rectangular member having detachable connectors on opposite ends, can detachably connect to the respective first and second side portions 18 and 20. The member can include various indicia for advertising or other purposes. Those skilled in the art will recognize that the member could attach to any suitable portion of the handle, such as the lower portion, the first side portion, the second side portion, or any combination thereof. In addition, the member can attach to the handle using any suitable method, including, but not limited to adhesive, fasteners, welding, and the like. The member can be made from any suitable material, including, but not limited to, metal, plastic, wood, paper product, fabric, glass, ceramic, leather, or other suitable material.

As shown in FIGS. 7-13, an embodiment constructed in accordance with the present disclosure, generally referred to as an alternate embodiment of a fishing lure injector 110 that includes a punch tube 112 moveably coupled with a handle 114 for movement between a retracted position (FIG. 7) and an extended position (FIG. 8). The fishing lure injector 110 can be used to create a bore 140 in an artificial lure 142 and inject bait 144 into the bore 140 to enhance the effectiveness of the lure 142. The injector 110 can operate with any number of different generally soft baits, which can have a plurality of different viscosities. The alternate embodiment of the fishing lure injector includes a second washer or collar 133 positioned on the punch tube to prevent the punch tube from unintentional removal from the handle 114 by being too large to pass between the upper portion 122 and the second side portion 120

The handle 114 is a generally rectangular-shaped frame having a lower portion 116, a first side portion 118, a second side portion 120, and an upper portion 122 (FIG. 9). Preferably, the handle 114 is a unitary wire that is bent at three points to form the generally rectangular shape. In the embodiment of FIGS. 7-13, the upper portion 122 includes an extension portion 123 extends beyond the second side portion 120 a predetermined distance, such as about 0.5". The upper end 124 of the second side portion 120 can be in contact with, but is not connected to the upper portion 122. Although, the embodiment of FIGS. 7-13 show a unitary wire handle, those skilled in the art will recognize that the handle 114 can also be formed by individual pieces that are joined together by any suitable means, such as welding, bonding, or adhesive.

In an alternate embodiment, the upper portion 122 can be detachably connected to the rest of the handle 114. In addition, the detachable upper portion 122 can attach to other shapes and sizes of handles, which may include various advertising materials, indicia.

The punch tube 112 is a generally linear hollow tube configured for moveable, preferably sliding, engagement with the upper portion 122 of the handle 114. The inner surface of the tube 112 is generally smooth and sized for a generally sliding fit with the upper portion 122 of the handle 114. A front end 126 of the tube 112 is configured for punching a bore 140 into an artificial lure 142, receiving bait, and injecting bait 144 into the bore 140. A rear end 128 of the tube 112 has an outwardly flared rim 130 that is configured to prevent the punch tube 112 from unintentional removal from the handle 114 (FIG. 8). For example, the flared rim 130 is too large to pass between the upper portion 122 and the second side portion 120 and cannot pass through the first side portion 118. In addition, the second washer 133 also prevents the punch tube from unintentional removal from the handle 114 by being too large to pass between the upper portion 122 and the second side portion 120. In this way, the length of movement of the tube 112 along the upper portion 122 is determined by the distance between the first side portion 118 and the second side portion 120. The retracted position is defined as when the flared rim 130 is in contact with the first side portion 118. The extended position is defined as when the second washer 133 is in contact with the second side portion 124. Although the embodiment of FIGS. 7-13 show a punch tube 112 having a generally circular cross-section, the punch tube can have any suitable shape cross-section, including, but not limited to, square, oval, rectangular, triangular, rectilinear, or curvilinear.

A washer or collar 132 moveably, preferably sliding, engages the upper portion 122. During use, the washer 132 can be positioned at a predetermined position along the upper portion 122 for use as an indicator for the length of movement of the tube 112. The washer 132 also provides for a comfortable engagement of the flared rim 130 by the fingers of the user. The washer 132 is preferably made from a soft material, such as felt, but any suitable material can be used.

The handle 114 and punch tube 112 are preferably made from a metal material, such as steel or aluminum. However, any suitable material can be used, including, but not limited to plastic, wood, composite, or other material.

In operation, the user moves the punch tube 112 to the extended position (FIG. 8). The user positions the front end 126 of the tube 112 at the desired position on the artificial lure 142 and presses the tube 112 into and/or through the lure 142 (FIG. 11). FIGS. 11-12 shows the bore 140 extending into the top of the lure 142. However, the bore 140 can be located anywhere on the respective lure 142. The tube 112 is removed from the lure 142, thereby creating the bore 140. The user moves the tube 112 to the retracted position, which advances the extended portion of the upper portion 122 through the tube 112 to push the piece of artificial lure 142 out of the tube 112. Next the user moves the tube 112 to the extended position and inserts the front end of the tube 112 into the bait 144 to fill the tube 112 (FIG. 13). The user inserts the tube 112 into the bore 142 and returns the tube 112 to the retracted position, which injects the bait 144 into the bore 142. The punch tube 112 can also be used to form bores in a lure of varying depths at varying angles. In addition, the tube 112 can punch a plurality of bores in a single lure 142. The lure 142 can be comprised of any plastic or rubber material.

Various types of advertising material or indicia may be incorporated into the injector 110. For example, a generally rectangular member having detachable connectors on opposite ends, can detachably connect to the respective first and second side portions 118 and 120. The member can include various indicia for advertising or other purposes. Those skilled in the art will recognize that the member could attach to any suitable portion of the handle, such as the lower portion, the first side portion, the second side portion, or any combination thereof. In addition, the member can attach to the handle using any suitable method, including, but not limited to adhesive, fasteners, welding, and the like. The member can be made from any suitable material, including, but not limited to, metal, plastic, wood, paper product, fabric, glass, ceramic, leather, or other suitable material.

Changes can be made in the above constructions without departing from the scope of the disclosure, it is intended that all matter contained in the above description or shown in the accompanying drawings shall be interpreted as illustrative and not in a limiting sense.

What is claimed is:

1. A tool for injection of bait into a fishing lure, comprising:
    a handle with a first side portion, a lower portion, a second side portion, a generally linear upper portion, thereby defining a gap between the second side portion and the upper portion;
    a punch tube moveably engaged with the upper portion of the handle for movement between a retracted position and an extended position, has a front portion and a rear portion, the rear portion having an outwardly flared part that widens from the front portion to the rear portion of the punch tube so as to be configured to prevent the punch tube from unintentional removal from the handle, wherein the punch tube is configured to bore the fishing lure, has a hollow portion to receive bait in the punch tube, and inject bait from the punch tube into the bored fishing lure by advancement of the upper portion through the punch tube as the punch tube is moved to the retracted position; and,
    a washer moveably engaged on the punch tube and positioned between the second side portion of the handle and the flared part of the punch tube to further inhibit removal of the punch tube from the upper portion of the handle.

2. The injector tool of claim 1, the handle being comprised of a unitary wire member.

3. The injector tool of claim 1, further comprising a collar moveably engaged with the upper portion of the handle, wherein the collar can be positioned along a length of the upper portion as an indicator for a predetermined length of travel of the punch tube.

4. An injector and boring tool, comprising:
    a handle comprising a first side portion, a lower portion, a second side portion, with a generally linear upper portion, thereby defining a gap between the second side portion and the upper portion and wherein a plurality of fingers fit comfortably between the first and second side portions; and
    a punch tube having a front portion and a rear portion, the rear portion having an outwardly flared part that widens from the front portion to the rear portion of the punch tube so as to be configured to prevent the punch tube from unintentional removal from the injector and boring tool, the punch tube being moveably engaged with the upper portion of the handle for movement between a retracted position and an extended position, wherein the punch tube is configured to bore material and to extract the material into a hollow portion of the punch tube, and to inject the material from the hollow portion of the punch tube into a bored fishing lure by advancement of the upper portion of the handle through the punch tube as the punch tube is moved to the retracted position; and,
    a washer moveably engaged on the punch tube and positioned between the second side portion of the handle and the flared part of the punch tube to further inhibit removal of the punch tube from the upper portion of the handle.

5. The injector and boring tool of claim 4, wherein the handle being comprised of a unitary wire member.

6. The injector and boring tool of claim 4, wherein the outwardly flared part of the punch tube comprises a flared end.

7. The injector and boring tool of claim 4, further comprising a collar moveably engaged with the upper portion of the handle, wherein the collar can be positioned along a length of the upper portion as an indicator for a predetermined length of travel of the punch tube.

8. A method of injecting bait into an artificial lure, comprising the steps of:
    providing an injector tool having a handle comprising a first side portion, a lower portion, a second side portion, with a generally linear upper portion, thereby defining a gap between the second side portion and the upper portion and a punch tube having a front portion and a rear portion, the rear portion having an outwardly flared part that widens from the front portion to the rear portion of the punch tube so as to be configured to inhibit the punch tube from unintentional removal from the injector tool, the punch tube moveably engaged with the upper portion for movement between a retracted position and an extended position, wherein the punch tube is configured to bore the artificial lure, has a hollow portion to receive bait in the punch tube, and inject bait from the punch tube into the bored artificial lure by advancement of the upper portion through the punch tube as the punch tube is moved to the retracted position, and a washer moveably engaged on the punch tube and positioned between the second side portion of the handle and the flared part of the punch tube to further inhibit removal of the punch tube from the upper portion of the handle;

positioning the punch tube at a predetermined extended position along the upper portion;

inserting the punch tube into the artificial lure;

removing the punch tube from the artificial lure along with a portion of the artificial lure, thereby forming a bore in the artificial lure; and removing the portion of the artificial lure from the punch tube by moving the punch tube to the retracted position.

9. The method of claim 8, further comprising the steps of:

repositioning the punch tube at the predetermined extended position along the upper portion;

inserting the punch tube into bait, thereby filling the punch tube with the bait;

inserting the punch tube into the bore; and injecting the bait into the bore by moving the punch tube to the retracted position.

10. The method of claim 8, wherein the step of inserting the punch tube into the artificial lure further comprises the step of inserting the punch tube into a side of the artificial lure.

11. The method of claim 8, wherein the step of inserting the punch tube into the artificial lure further comprises the step of inserting the punch tube into a top of the artificial lure.

12. The method of claim 8, wherein the step of inserting the punch tube into the artificial lure further comprises the step of inserting the punch tube into a bottom of the artificial lure.

13. The method of claim 8, wherein the handle being comprised of a unitary wire member.

14. The method of claim 8, wherein the punch tube comprising a flared end.

15. The method of claim 8, further comprising a collar moveably engaged with the upper portion of the handle, wherein the collar can be positioned along a length of the upper portion as an indicator for a predetermined length of travel of the punch tube.

* * * * *